United States Patent
Keum et al.

(10) Patent No.: US 9,615,119 B2
(45) Date of Patent: Apr. 4, 2017

(54) METHOD AND APPARATUS FOR PROVIDING TIMESHIFT SERVICE IN DIGITAL BROADCASTING SYSTEM AND SYSTEM THEREOF

(75) Inventors: Ji-Eun Keum, Suwon-si (KR); Jae-Yeon Song, Seoul (KR); Bo-Sun Jung, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 301 days.

(21) Appl. No.: 13/075,718

(22) Filed: Mar. 30, 2011

(65) Prior Publication Data

US 2011/0246563 A1 Oct. 6, 2011

(30) Foreign Application Priority Data

Apr. 2, 2010 (KR) .................. 10-2010-0030648
Jul. 21, 2010 (KR) .................. 10-2010-0070624

(51) Int. Cl.
*G06F 15/16* (2006.01)
*H04N 21/2747* (2011.01)
*H04N 7/173* (2011.01)
*H04N 21/472* (2011.01)

(52) U.S. Cl.
CPC ..... *H04N 21/2747* (2013.01); *H04N 7/17318* (2013.01); *H04N 21/472* (2013.01)

(58) Field of Classification Search
CPC ............ H04L 29/08072; H04L 29/06; H04L 29/0809; H04L 29/06047; G06Q 30/02
USPC ................... 709/201, 202, 203, 216
See application file for complete search history.

(56) References Cited

U.S. PATENT DOCUMENTS

| 5,818,510 | A | * | 10/1998 | Cobbley ........... G06F 17/30817 348/E5.108 |
| 5,926,206 | A | | 7/1999 | Mihara et al. |
| 6,542,933 | B1 | * | 4/2003 | Durst et al. .................. 709/229 |
| 8,260,947 | B2 | | 9/2012 | Mine et al. |
| 8,273,123 | B2 | | 9/2012 | Ben Nun |

(Continued)

FOREIGN PATENT DOCUMENTS

| CN | 1914877 A | 2/2007 |
| CN | 101459693 A | 6/2009 |

(Continued)

OTHER PUBLICATIONS

Alex Zambelli, IIS Smooth Streaming Technical Overview, Microsoft Corporation, Mar. 2009, pp. 1-17.

(Continued)

*Primary Examiner* — Hassan Phillips
*Assistant Examiner* — Siren Wei
(74) *Attorney, Agent, or Firm* — Jefferson IP Law, LLP (57) ABSTRACT

A system and method for providing content in a digital broadcasting system are provided. The system includes a server for, after a lapse of a buffering time of a segment of the content, storing the segment, and for transmitting an updated Multimedia Presentation Description (MPD) including Uniform Resource Location (URL) information indicating a location where the segment is stored, and a client device for receiving the updated MPD, and for acquiring the segment stored in the location indicated by the URL information included in the updated MPD.

28 Claims, 10 Drawing Sheets

(56) References Cited

U.S. PATENT DOCUMENTS

| | | | |
|---|---|---|---|
| 2002/0143907 A1* | 10/2002 | Tsurubayashi | H04L 29/06 709/221 |
| 2002/0174442 A1 | 11/2002 | Nomura | |
| 2003/0105925 A1* | 6/2003 | Yoshimura | G06F 17/30902 711/118 |
| 2004/0264396 A1* | 12/2004 | Ginzburg | H04W 52/0232 370/311 |
| 2005/0089035 A1* | 4/2005 | Klemets et al. | 370/390 |
| 2005/0183120 A1 | 8/2005 | Jain et al. | |
| 2005/0203927 A1* | 9/2005 | Sull | G06F 17/30858 |
| 2006/0003751 A1* | 1/2006 | Vo | 455/414.1 |
| 2007/0019247 A1* | 1/2007 | Yoon | H04M 1/72547 358/450 |
| 2007/0130597 A1 | 6/2007 | Parker et al. | |
| 2007/0174881 A1* | 7/2007 | Idehara | H04L 29/06027 725/90 |
| 2007/0223443 A1 | 9/2007 | Wang et al. | |
| 2009/0106443 A1 | 4/2009 | Klemets | |
| 2009/0254959 A1 | 10/2009 | Blackwell | |
| 2009/0293092 A1 | 11/2009 | Guo et al. | |
| 2010/0070644 A1 | 3/2010 | Lim et al. | |
| 2010/0263013 A1 | 10/2010 | Asakura | |
| 2011/0320629 A1 | 12/2011 | Wu | |

FOREIGN PATENT DOCUMENTS

| | | |
|---|---|---|
| CN | 101662661 A | 3/2010 |
| CN | 101674187 A | 3/2010 |
| CN | 101674787 A | 3/2010 |
| JP | 2005-295467 A | 10/2005 |
| JP | 2007-509573 A | 4/2007 |
| JP | 2009-517945 A | 4/2009 |
| JP | 2009-540725 A | 11/2009 |
| KR | 10-0457931 B1 | 5/2005 |
| KR | 10-0752879 B1 | 8/2007 |
| KR | 10-2008-0079013 A | 8/2008 |
| WO | 2007/116334 A2 | 10/2007 |
| WO | 2008/069523 A1 | 6/2008 |
| WO | 2009/069692 A1 | 6/2009 |

OTHER PUBLICATIONS

Updates to Adaptive HTTP Streaming, Qualcomm Incorporated, 3GPPSA4#57, Jan. 2010, pp. 2-12, S4-100185, St. Julian, Malta.
Media Presentation Description in HTTP Streaming, Telefon AB LM Erisson, 3GPPSA4#57, Jan. 2010, pp. 2-12, S4-100080, St. Julian, Malta.
Qualcomm Incorporated, Pseudo CR: Adaptive HTTP Streaming—Full Solution Proposal, 3GPP Draft; S4-100060_HTTP-Streaming-FSP, 3rd Generation Partnership Project (3GPP), Mobile Competence Centre; Jan. 20, 2010, vol. SA WG4.
Telefon AB LM Ericsson et al., Media Presentation Description in HTTP Streaming, 3GPP Draft; S4-100080- MPD, 3rd Generation Partnership Project (3GPP), Mobile Competence Centre, Jan. 20, 2010, vol. SA WG4.
Qualcomm Europe S.A.R.L., Adaptive HTTP Streaming: Changes to Media Presentations, 3GPP Draft; S4-AHI134_Presentation_Changes_Final, 3rd Generation Partnership Project (3GPP), Mobile Competence Centre; Dec. 11, 2009, vol. SA WG4.

* cited by examiner

METHOD AND APPARATUS FOR PROVIDING TIMESHIFT SERVICE IN DIGITAL BROADCASTING SYSTEM AND SYSTEM THEREOF

PRIORITY

This application claims the benefit under 35 U.S.C. §119(a) of a Korean patent application filed in the Korean Intellectual Property Office on Apr. 2, 2010 and assigned Serial No. 10-2010-0030648, and of a Korean patent application filed in the Korean Intellectual Property Office on Jul. 21, 2010 and assigned Ser. No. 10-2010-0070624, the entire disclosure of each of which is hereby incorporated by reference.

BACKGROUND OF THE INVENTION

1. Field of the Invention

The present invention relates to a method and apparatus for providing a timeshift service. More particularly, the present invention relates to a method and apparatus for providing a timeshift service in a digital broadcasting system, and a system thereof.

2. Description of the Related Art

Recently, the growing number of users accessing on-line content over digital broadcasting systems has increased the importance of seamless content delivery. Because of this, adaptive streaming technology has attracted public attention, in which a bit rate of content being delivered is smoothly changed according to the change in the available transmission bandwidth and/or user device performance. This adaptive streaming technology optimizes the bit rate by analyzing the network environments of users. Like the adaptive streaming, content delivery technology, which has been discussed in many standards bodies, selects and plays small segments, which are divided from content based on a Hyper Text Transfer Protocol (HTTP), by user terminals depending on the circumstances, allowing users to seamlessly enjoy the content without delay.

In the Internet Protocol (IP)-based convergence era, convergence of telecommunication and broadcasting is a marketable new business model, which attracts attention as one of the future market-leading technologies. Particularly, Internet Protocol TeleVision (IPTV) is technology that not only provides new services produced by recombining or integrating the existing TV, voice, and data technologies, but also supports interactivities, making it possible to create a variety of business models and services. Unlike the existing service delivery technology specific to the limited terminal environments, the IPTV technology provides services to fixed terminals (e.g., set-top boxes, PCs, and TVs), mobile terminals (e.g., cell phones, and Personal Digital Assistants (PDAs)), wired/wireless networks, and broadcast networks, regardless of the types of terminals and networks, making it possible not only to provide and apply the same services in many different environments, but also to develop various types of services taking various environments into account.

While broadcast content is being played, a user may select and re-view the content having already been played. Generally, this is called a 'timeshift' function. It is typical that a device supporting the timeshift function includes a storage device with a specific capacity (e.g., a buffer, a hard disk, and a memory). In this case, however, the timeshift function may be limited to the storage capacity of the storage device. In other words, in the conventional technology, it is not possible to provide the timeshift function to the content having been played earlier than the last stored content of a specific size, and/or to part of the same content. Likewise, the timeshift function may not be provided, even when the content of a specific size is stored in a server or the like on the network, rather than in the device. In the conventional technology, timeshift buffer depth 'timeShiftBufferDepth' information is transmitted to a client, using a Multimedia Presentation Description (MPD). A value of the timeShiftBufferDepth represents a period for which a server buffers segments. Conventionally, therefore, after a lapse of 'representation time'+'timeShiftBufferDepth' for each segment, it is not possible to access the related segment.

SUMMARY OF THE INVENTION

Aspects of the present invention are to address at least the above-mentioned problems and/or disadvantages and to provide at least the advantages described below. Accordingly, an aspect of the present invention is to provide a method and apparatus for providing a timeshift service in a digital broadcasting system, and a system thereof.

In accordance with an aspect of the present invention, a system for providing content in a digital broadcasting system is provided. The system for providing content includes a server for, after a lapse of a buffering time of a segment of the content, storing the segment, and for transmitting an updated Multimedia Presentation Description (MPD) including Uniform Resource Location (URL) information indicating a location where the segment is stored, and a client device for receiving the updated MPD, and for acquiring the segment stored in the location indicated by the URL information included in the updated MPD.

In accordance with another aspect of the present invention, a method for providing content by a server in a digital broadcasting system is provided. The method includes, after a lapse of a buffering time of a segment of the content, storing the segment, and transmitting, to a client device, an updated Multimedia Presentation Description (MPD) including Uniform Resource Location (URL) information indicating a location where the segment is stored.

In accordance with yet another aspect of the present invention, a server device for providing content for digital broadcast is provided. The server device, after a lapse of a buffering time of a segment of the content, stores the segment, and transmits, to a client device, an updated Multimedia Presentation Description (MPD) including Uniform Resource Location (URL) information indicating a location where the segment is stored.

In accordance with yet another aspect of the present invention, a method for acquiring content by a client device in a digital broadcasting system is provided. The method includes, after a lapse of a buffering time of a segment of the content, receiving an updated Multimedia Presentation Description (MPD) including Uniform Resource Location (URL) information of a server where the segment is stored, and acquiring the segment stored in the location indicated by the URL information included in the updated MPD.

In accordance with still another aspect of the present invention, a client device for receiving digital broadcast content is provided. The client device, after a lapse of a buffering time of a segment of the content, receives an updated Multimedia Presentation Description (MPD) including Uniform Resource Location (URL) information of a server where the segment is stored, and acquires the segment stored in the location indicated by the URL information included in the updated MPD.

In accordance with still another aspect of the present invention, a server device for providing content for digital broadcast is provided. The device includes a storage means for, after a lapse of a buffering time of the segment of the content, storing a segment of the content, and a transmission means for transmitting, to a client device, an updated Multimedia Presentation Description (MPD) including Uniform Resource Location (URL) information indicating a location where the segment is stored in the storage means.

In accordance with still another aspect of the present invention, a client device for receiving content for digital broadcast is provided. The client device includes a reception means for, after a lapse of a buffering time of a segment of the content, receiving an updated Multimedia Presentation Description (MPD) including Uniform Resource Location (URL) information of a server where the segment is stored, and an acquisition means for acquiring the segment stored in the location indicated by the URL information included in the updated MPD.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skilled in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although the terms of entities defined in the Open Internet Protocol TeleVision (IPTV) Forum (OIPF) standard will be used herein for a better understanding of the present invention, the standard and the terms are not intended to limit the scope of the present invention, and the present invention may be applied to any systems having the similar technical backgrounds.

Exemplary embodiments of the present invention provide a method and system, in which while receiving a live stream from a server by Hyper Text Transfer Protocol (HTTP)-based adaptive streaming, if a client requests to play content after going back to the past, the content is serviced depending on the request.

Figure 1:
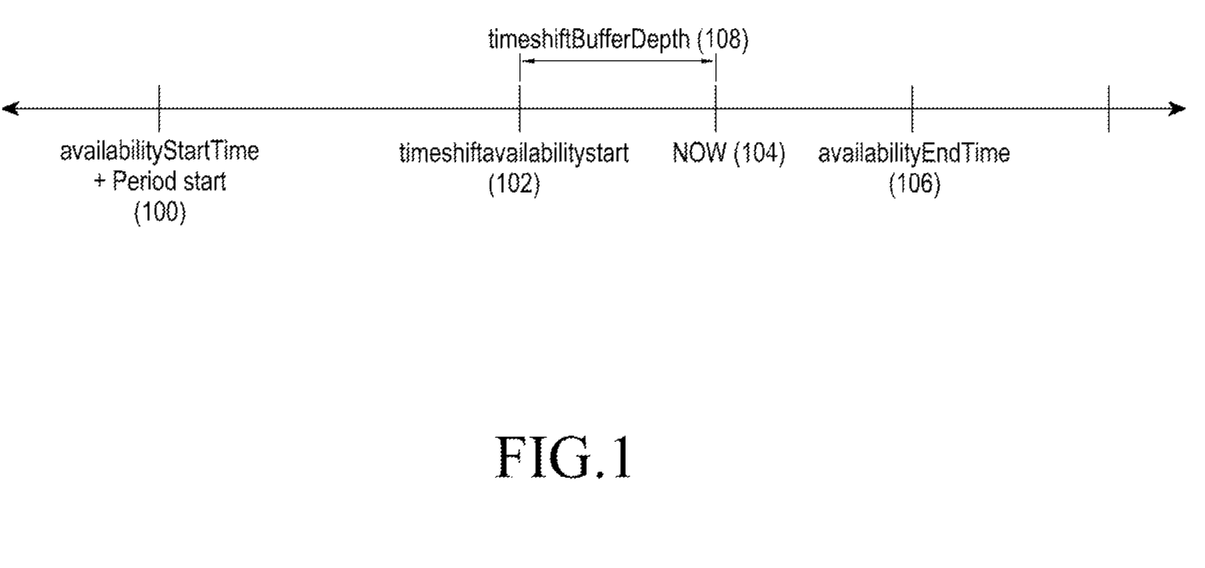
FIG. 1 is a diagram conceptually illustrating definitions of terms related to the times used in a digital broadcasting system according to an exemplary embodiment of the present.

FIG. 1 is a diagram conceptually illustrating definitions of terms related to the times used in a digital broadcasting system according to an exemplary embodiment of the present invention. For these terms, reference can be made to $3^{rd}$ Generation Partnership Project (3GPP) TSG-SA4 MBS Adhoc #6, which is a 3GPP standard document.

An 'availabilityStartTime+Periodstart' time 100 refers to the availability time for getting the first segment in the Representation of the Period. In other words, the time 100 refers to the time at which a first segment can be acquired in a broadcast service period.

A 'timeShiftAvailabilityStart' time 102 is a time at which the broadcast service may undergo timeshift. Its value is determined by subtracting 'timeShiftBufferDepth' 108 from 'NOW' 104.

The 'NOW' time 104 refers to the present time at which the user is consuming content.

An 'availabilityEndTime' time 106 refers to an available end time for segments in a Multimedia Presentation Description (MPD). The 'timeShiftBufferDepth' time 108 refers to a content buffering period for which a server may provide the timeshift service, for live presentation.

Figure 2:
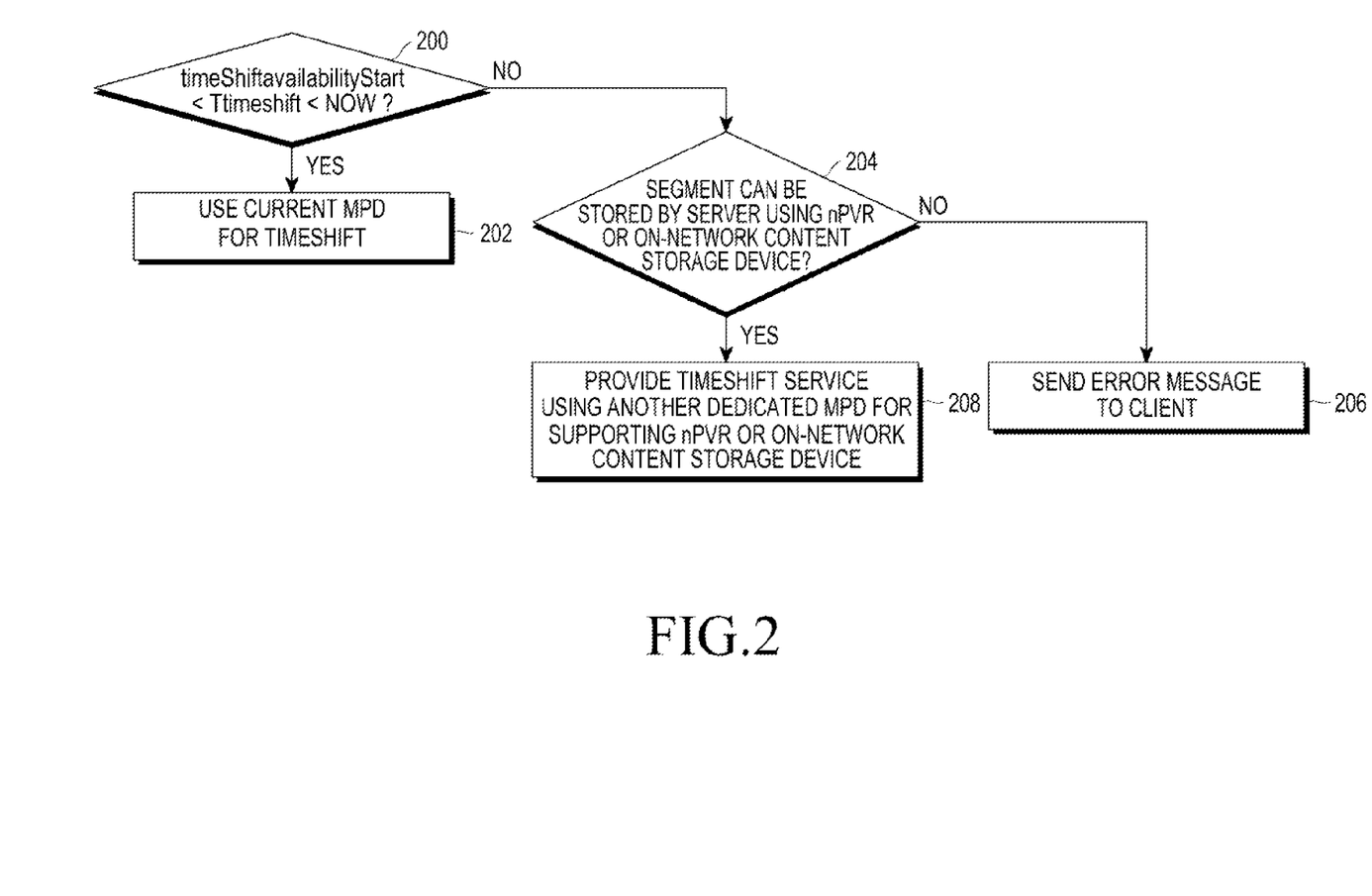
FIG. 2 is a flowchart illustrating an operation of a server, performed depending on whether a 'Ttimeshift' time exists between a 'timeShiftAvailabilityStart' time and a 'NOW' time according to an exemplary embodiment of the present invention.

FIG. 2 is a flowchart illustrating an operation of a server, performed depending on whether a ' Ttimeshift' time exists between a 'timeShiftAvailabilityStart' time and a 'NOW' time according to an exemplary embodiment of the present invention. The 'Ttimeshift' time refers to a broadcast time of a segment to which a user desires to jump and play it.

In step 200, a server determines if a 'Ttimeshift' time exists between a 'timeShiftAvailabilityStart' time and a 'NOW' time. If it is determined in step 200 that the 'Ttimeshift' time does exist between the 'timeShiftAvailabilityStart' time and the 'NOW' time, the server transmits a segment corresponding to the time requested by a client, to the client using the current MPD file in step 202. However, if it is determined in step 200 that the 'Ttimeshift' time does not exist between the 'timeShiftAvailabilityStart' time and the 'NOW' time, the server determines in step 204 whether it has a function of storing segments using a network Personal Video Recorder (nPVR) or on-network content storage device. If it is determined in step 204 that the server does not have the function of storing segments using the nPVR or on-network content storage device, the server sends an error message to the client in step 206. However, if it is determined in step 204 that the server has the function of storing segments using the nPVR or on-network content storage device, the server provides the timeshift service using another dedicated MPD file for supporting the nPVR or on-network content storage device in step 208. The below-described exemplary embodiments of the present invention are related to a method of providing the timeshift service using the nPVR or on-network content storage device.

An MPD file, which is newly created to provide the timeshift service using the nPVR or on-network content storage device, requires additional attribute values as shown in Table 1 below. In Table 1, 'Broadcast start Time' and 'Broadcast end Time' represent a time for which content was actually broadcasted using its associated MPD. That is, 'Broadcast start Time' represents a start time at which broadcast of the content was actually started in the past, and 'Broadcast end Time' represents an end time at which broadcast of the content was actually ended in the past.

The information in Table 1 may be transmitted to clients using another method, for example, a method of transmitting a separate message, instead of the method of transmitting the attribute values of the MPD. Exemplary embodiments of the present invention include any method capable of transmitting the information in Table 1 to clients. Uniform Resource Location (URL) information representing each representation or segment is also changed. Table 1 shows information that should be transmitted to clients according to an exemplary embodiment of the present invention.

TABLE 1

| Element or Attribute Name | Type (Attribute or Element) | Cardinality | Optionality | Description |
| --- | --- | --- | --- | --- |
| MPD | E | 1 | M | The root element that carries the Media Presentation Description for a presentation. |
| Broadcasted start Time | A | | O | This is used when this MPD is for timeshift usage of Live streaming Contents. The value of this indicates the starting broadcasted time in the past (UTC) |
| Broadcasted end Time | A | | O | This is used when this MPD is for timeshift usage of Live streaming Contents. The value of this indicates the ending broadcasted time in the past (UTC) |

An exemplary method for providing a timeshift service according to the present invention will be described below with reference to FIGS. 3 and 4.

Figure 3:
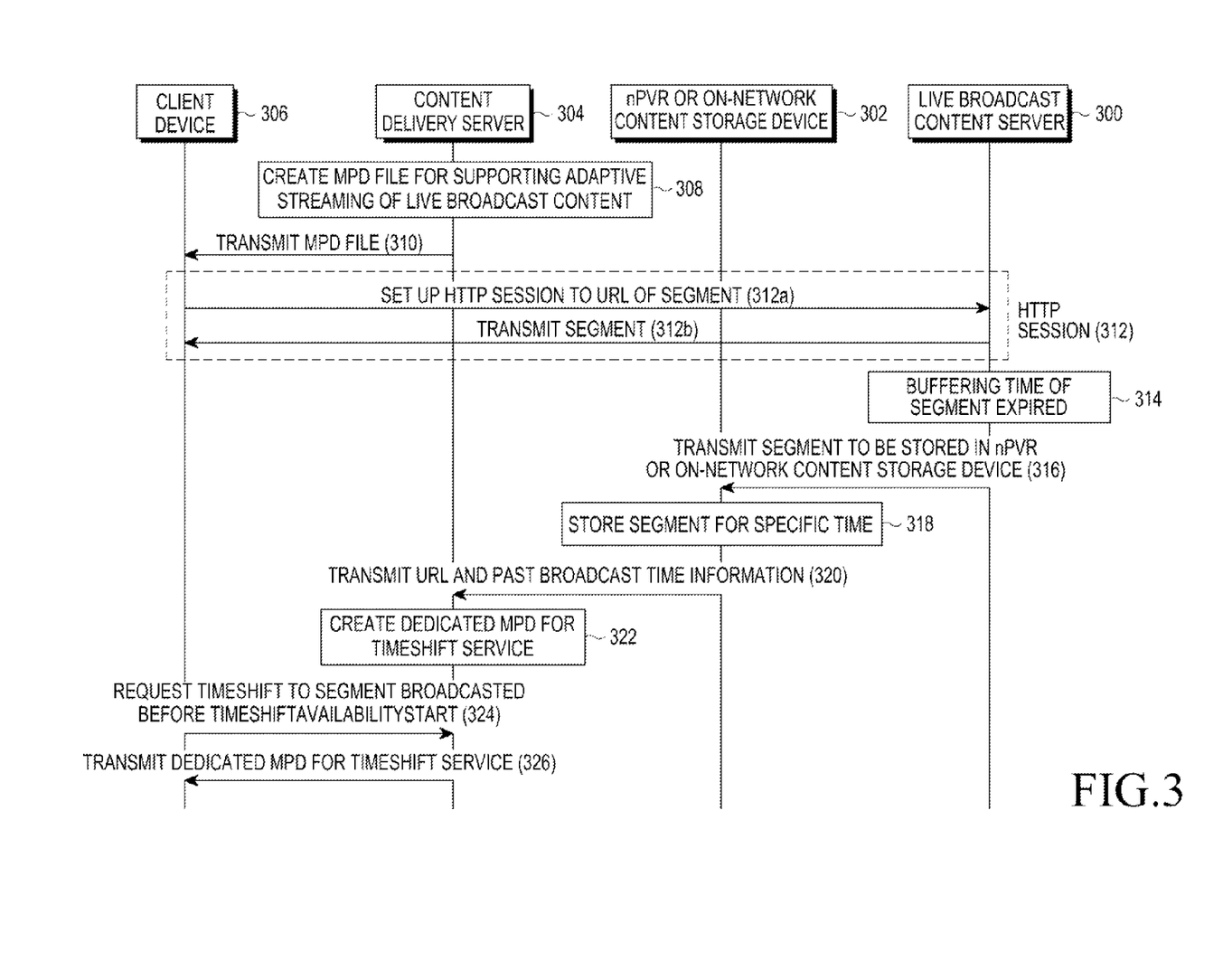
FIGS. 3 and 4 are flow diagrams illustrating an operation among devices according to an exemplary embodiment of the present invention.
Figure 4:
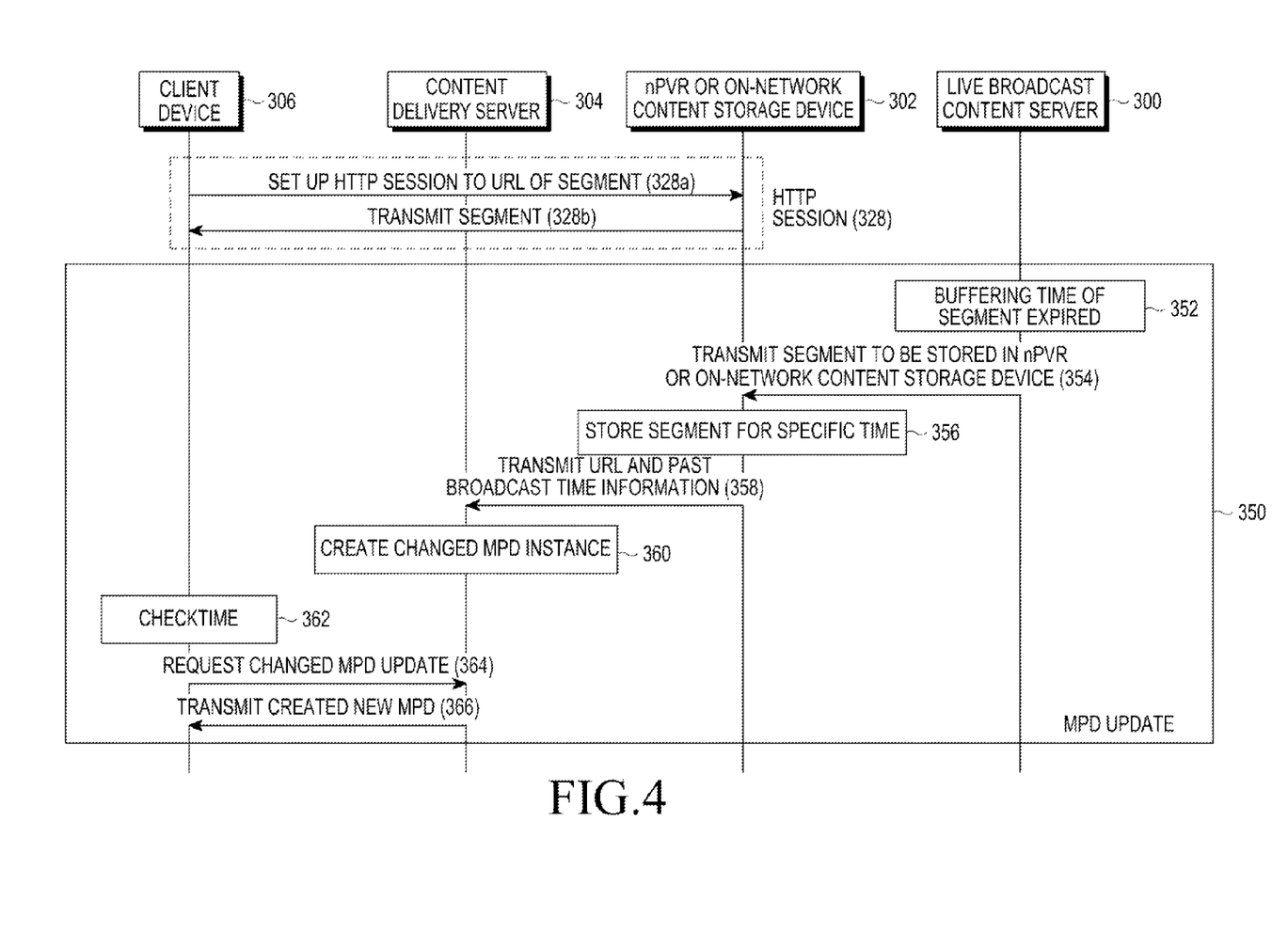

FIGS. 3 and 4 are flow diagrams illustrating an operation among devices according to an exemplary embodiment of the present invention. FIGS. 3 and 4 are separated from a single drawing, for convenience purpose only. In an exemplary adaptive streaming-supporting process, a live broadcast content server 300 transmits a segment that cannot be buffered any longer, to an nPVR or on-network content storage device 302 at a time at which buffering for each segment is ended in the live broadcast content server 300.

A content delivery server 304, which is a server managed by a service provider supporting an HTTP adaptive streaming service, is adapted to create an MPD file associated with content and transmit the created MPD file to a client 306. The live broadcast content server 300 corresponds to an HTTP server that actually has and provides content to be broadcasted live. The nPVR or on-network content storage device 302 is a storage that is managed by a service provider or a network service operator. Although the above three entities—the live broadcast content server 300, the nPVR or on-network content storage device 302, and the content delivery server 304—are implemented as independent logical entities, they may be actually implemented as one or two physical entities, such as servers.

The content delivery server 304 creates an MPD file for supporting adaptive streaming of live broadcast content in step 308, and transmits (delivers) the created MPD file to the client 306 in step 310.

In step 312, the client 306 and the live broadcast content server 300 set up an HTTP session. To be more specific, in step 312a, the client 306 sets up an HTTP session to a URL of the live broadcast content server 300. In step 312b, the live broadcast content server 300 transmits a segment corresponding to the MPD file to the client 306 using the HTTP session. In a process of supporting adaptive streaming, at a time 314 at which buffering of the segment is ended, the live broadcast content server 300 transmits the content segment to the nPVR or on-network content storage device 302 or a storage device in step 316. In step 318, the nPVR or on-network content storage device 302 stores the received content segment for a specific time. With the passage of time, segments are continuously delivered from the live broadcast content server 300 and stored in the nPVR or on-network content storage device 302.

Therefore, in step 320, the nPVR or on-network content storage device 302 transmits, to the content delivery server 304, storage information of the stored segments, for example, information (e.g., URL information) about the sever location where the segments are stored, and information about the broadcast time in which the segments were actually broadcasted. In step 322, the content delivery server 304 creates a dedicated MPD for a timeshift service.

In step 324, the client 306 requests the content delivery server 304 to make a timeshift to the segment, which was broadcasted before a 'timeShiftAvailabilityStart' time. In step 326, the content delivery server 304 transmits the dedicated MPD for a timeshift service to the client 306 in response to the request made in step 324. In step 328, the client 306 sets up an HTTP session to the nPVR or on-network content storage device 302. To be more specific, in step 328a, the client 306 sets up an HTTP session to an URL of the nPVR or on-network content storage device 302 in which an associated file is stored according to the MPD received in step 326. In step 328b, the nPVR or on-network content storage device 302 transmits the segment requested by the client 306 to the client 306 using the HTTP session. Based on the information received in step 320, the content delivery server 304 continues to create a new MPD for a timeshift service in step 322. In step 326, with the passage of time, the content delivery server 304 continues to transmit the MPD to the client 306.

In step 326, the content delivery server 304 transmits even checktime-related information for checking the time at which the next MPD update comes, along with the MPD, for the next MPD update. Therefore, an MPD update process by the client 306, corresponding to step 350 in FIG. 4, should be repeated by periods. A more detailed description thereof will be made below.

In an exemplary process of supporting adaptive streaming, at a time 352 at which buffering of the segment is ended, the live broadcast content server 300 transmits the content segment to the nPVR or on-network content storage device 302 or a storage device in step 354. In step 356, the nPVR or on-network content storage device 302 stores the received content segment for a specific time. With the passage of time, segments are continuously delivered from the live broadcast content server 300 and stored in the nPVR or on-network content storage device 302.

Therefore, in step 358, the nPVR or on-network content storage device 302 transmits, to the content delivery server 304, storage information of the stored segments, for example, information (e.g., URL information) about the sever location where the segments are stored, and information about the broadcast time in which the segments were actually broadcasted. In step 360, the content delivery server 304 creates a changed MPD instance.

If the checktime has come in step 362, the client 306 requests the content delivery server 304 to update the changed MPD in step 364. In step 366, the content delivery server 304 transmits an updated MPD to the client 306.

As a result, to support the timeshift of live streaming, an MPD for the content stored in the nPVR or on-network content storage device 302 is re-created in the form where continuous update is required.

As to the update time, the update may be performed periodically using the checktime, or may be performed by events.

Figure 5:
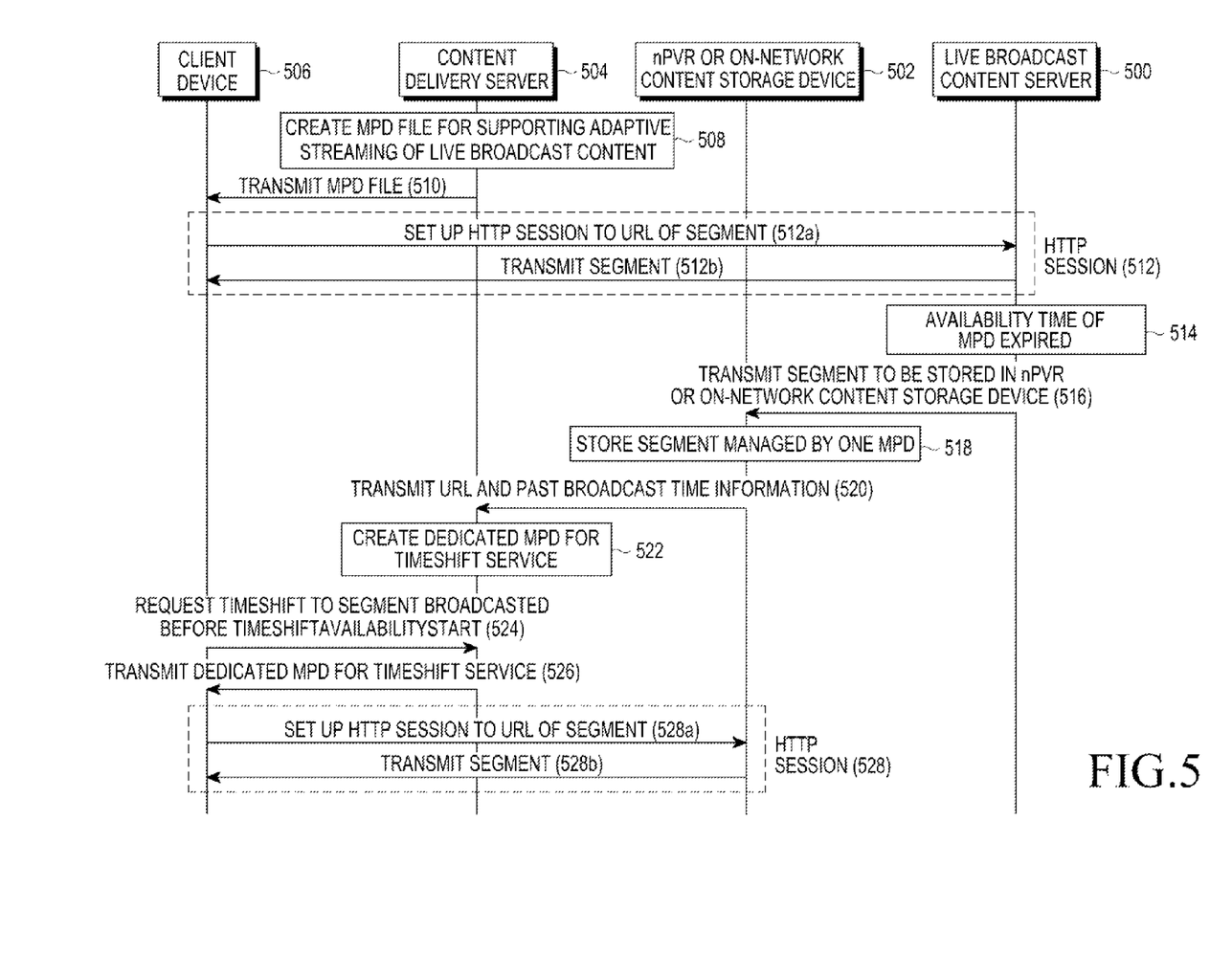
FIG. 5 is a flow diagram illustrating an operation among devices according to an exemplary embodiment of the present invention.

As an example of an exemplary embodiment of the present invention, a method will be described in which when a broadcast time of the segment that can be provided using an MPD is over, a live broadcast content server 500 transmits the content segment to an nPVR or on-network content storage device 502 to store the segment therein. In this exemplary method, an error may occur, if a client requests a segment associated with the time in which no content is buffered in a server for the timeshift, among the segments capable of presently being provided with an MPD file, i.e., if the client requests a segment satisfying a condition of availabilityStartTime+
Periodstart<Ttimeshift<timeShiftAvailabilityStart.

However, the service provider may have the inconvenience of transmitting and storing segments in real time and continuing to change the MPD according to information about the stored segments. Therefore, the service provider may choose a method of providing adaptive streaming by storing content in the nPVR or on-network content storage device 502 in units of segments in which one MPD file is involved, or in units of one program. In this case, an MPD file needs a new attribute indicating whether segments managed by the MPD are capable of timeshift or not. If a value of this attribute is "True", the content segments received using the MPD file carry information related to the segments broadcasted for a valid time of the MPD, i.e., a checktime or availabilityEndTime which is an update time of the next MPD, from the nPVR or on-network content storage device 502 to a content delivery server 504 at once, to create a new MPD corresponding to the existing MPD file for live streaming broadcast. The new MPD includes URL information of each segment, and information representing the past broadcast time.

An operation among devices according to an exemplary embodiment of the present invention will be described below with reference to FIG. 5.

Referring to FIG. 5, the content delivery server 504 creates an MPD file for supporting adaptive streaming of live broadcast content in step 508, and transmits the created MPD file to a client 506 in step 510.

In step 512, the client 506 and the live broadcast content server 500 set up an HTTP session. To be more specific, in step 512a, the client 506 sets up an HTTP session to a URL of the live broadcast content server 500. In step 512b, the live broadcast content server 500 transmits a segment requested by the client 506 to the client 506 using the HTTP session.

If an availability time of the MPD, i.e., a time between an 'availabilityStartTime' time and an 'availabilityEndTime' time expires in step 514, the live broadcast content server 500 transmits the content segment to be stored in the nPVR or on-network content storage device 502, to the nPVR or on-network content storage device 502 in step 516. In step 518, the nPVR or on-network content storage device 502 stores the segment(s) managed by one MPD. In step 520, the nPVR or on-network content storage device 502 transmits, to the content delivery server 304, storage information of the stored segments, for example, information (e.g., URL information) about the sever location where the segments are stored, and information about the broadcast time in which the segments were actually broadcasted.

In step 522, the content delivery server 504 creates a dedicated MPD for a timeshift service. In step 524, the client 506 requests the content delivery server 504 to make a timeshift to the segment, which was broadcasted before a 'timeShiftAvailabilityStart' time. In step 526, the content delivery server 504 transmits the dedicated MPD for a timeshift service to the client 506 in response to the request made in step 524. In step 528, the client 506 sets up an HTTP session to the nPVR or on-network content storage device 502. To be more specific, in step 528a, the client 506 sets up an HTTP session to an URL of the nPVR or on-network content storage device 502 in which an associated file is stored according to the MPD received in step 526. In step 528b, the nPVR or on-network content storage device 502 transmits the segment requested by the client 506 to the client 506 using the HTTP session.

Table 2 below shows the MPD that should be transmitted from the content delivery server 504 to the client 506 in step 526 according to the above described exemplary embodiment of the present invention.

TABLE 2

| Element or Attribute Name | Type (Attribute or Element) | Cardinality | Optionality | Description |
|---|---|---|---|---|
| MPD | E | 1 | M | The root element that carries the Media Presentation Description for a presentation. |
| TimeShift | A | | O | This is indicates whether the segments |

TABLE 2-continued

| Element or Attribute Name | Type (Attribute or Element) | Cardin- ality | Option- ality | Description |
|---|---|---|---|---|
| | | | | within this MPD are supported for timeshift or not. The expiration for timeshift function is until the Checktime or the availabilityEndTime |

An exemplary method will be described which updates segment information on a single-content basis and also updates an MPD file for management of an nPVR or on-network content storage device storing segments.

Figure 6:
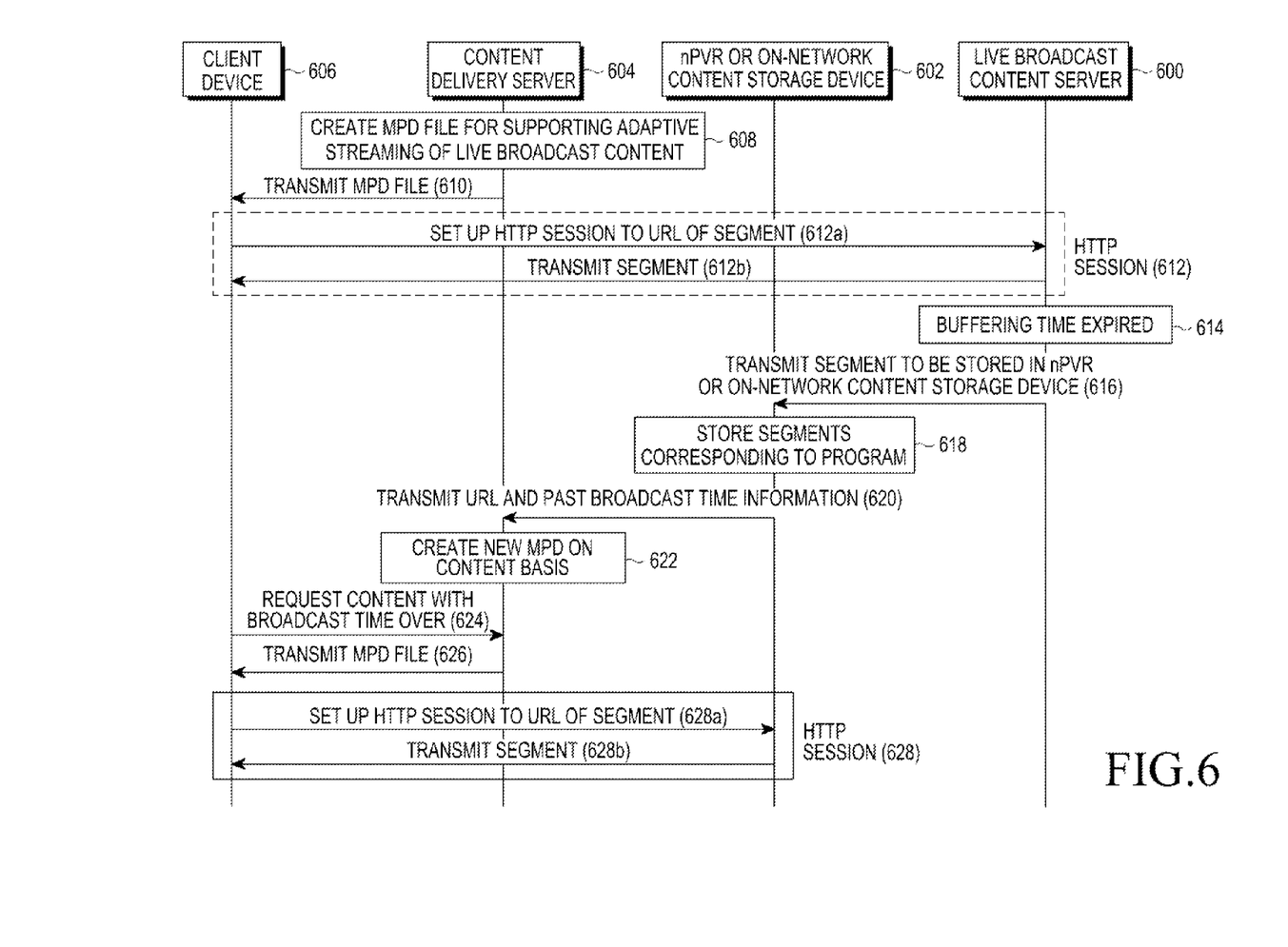
FIG. 6 is a flow diagram illustrating an operation among devices according to an exemplary embodiment of the present invention.

FIG. 6 is a flow diagram illustrating an operation among devices according to an exemplary embodiment of the present invention.

Referring to FIG. 6, a content delivery server 604 creates an MPD file for supporting adaptive streaming of live broadcast content in step 608, and transmits the created MPD file to a client 606 in step 610.

In step 612, the client 606 and the live broadcast content server 600 set up an HTTP session. To be more specific, in step 612a, the client 606 sets up an HTTP session to a URL of the live broadcast content server 600. In step 612b, the live broadcast content server 600 transmits a content file of the segment to the client 606 using the HTTP session.

If a buffering time of each segment expires in step 614, the live broadcast content server 600 transmits a segment having been completely buffered to an nPVR or on-network content storage device 602 in step 616. The nPVR or on-network content storage device 602 stores segments corresponding to each program using program information in the MPD in step 618, and transmits the related URL and broadcast time information to the content delivery server 604 in step 620. In step 622, the content delivery server 604 creates an MPD for each program based on the received information. Upon receiving a request for content, whose broadcast time is over, from the client 606 in step 624, the content delivery server 604 transmits an MPD file for the requested content to the client 606 in step 626. In step 628, the client 606 sets up an HTTP session to the nPVR or on-network content storage device 602.

To be more specific, in step 628a, the client 606 sets up an HTTP session to a URL of the nPVR or on-network content storage device 602 in which an MPD file is stored according to the MPD received in step 626. In step 628b, the nPVR or on-network content storage device 602 transmits the file requested by the client 606 to the client 606 using the HTTP session.

An exemplary method of providing an adaptive streaming service includes live broadcast regarded as Content-on-Demand (CoD) content.

Table 3 below shows a format of a general live broadcast MPD.

TABLE 3

```
<MPD type="Live">
    <ProgramInformation/>
    <Period start="00:00:00">
        <Representation bandwidth="8196" mimeType="...">
            <SegmentInfo duration="10">
```

TABLE 3-continued

```
                <Url sourceUrl="http://video.content.com/movie01/>
                ...
            </SegmentInfo>
        </Representation>
    <Period start="00:03:10">
        <Representation bandwidth="8196" mimeType="...">
            <SegmentInfo duration="10">
                <Url sourceUrl="http://video.content.com/movie01/>
                ...
            </SegmentInfo>
        </Representation>
    </Period>
    <Period start="00:06:20">
        <Representation bandwidth="8196" mimeType="...">
            <SegmentInfo duration="10">
                <Url sourceUrl="http://video.content.com/movie01/>
                ...
            </SegmentInfo>
        </Representation>
    </Period>
</MPD>
```

Table 4 below shows an exemplary MPD used in the present invention. Unlike Table 3, Table 4 shows an MPD format including the "Broadcast start Time", "Broadcast end Time" and "Timeshift" attributes defined in Tables 1 and 2, which correspond to exemplary embodiments of the present invention.

TABLE 4

```
<MPD type="Live">
    <ProgramInformation>
    <Timeshift='1'>
    <Broadcasting start time="2010-01-27 13:00">
    <Broadcasting end time="2010-01-27 15:00">
    <Period start="00:00:00">
        <Representation bandwidth="8196" mimeType="...">
            <SegmentInfo duration="10">
                <Url sourceUrl="http://video.content.com/movie01/>
                ...
            </SegmentInfo>
        </Representation>
    <Period start="00:03:10">
        <Representation bandwidth="8196" mimeType="...">
            <SegmentInfo duration="10">
                <Url sourceUrl="http://video.content.com/movie01/>
                ...
            </SegmentInfo>
        </Representation>
    </Period>
    <Period start="00:06:20">
        <Representation bandwidth="8196" mimeType="...">
            <SegmentInfo duration="10">
                <Url sourceUrl="http://video.content.com/movie01/>
                ...
            </SegmentInfo>
        </Representation>
    </Period>
</MPD>
```

In another exemplary embodiment of the present invention, a URL or URI value by which a dedicated MPD for an nPVR may be fetched, may be inserted in a live broadcast MPD as shown in Table 5 below.

TABLE 5

| Attribute | Type | Cardinality | Optionality | Description |
|---|---|---|---|---|
| nPVR_MPD_link | attribute | 1 | O | This is used when the live streaming segments are stored at the server side |

TABLE 5-continued

| Attribute | Type | Cardinality | Optionality | Description |
|---|---|---|---|---|
| | | | | storage or nPVR. This attribute indicates the URL/URI for retrieving MPD on the segments on nPVR. |

Figure 7:
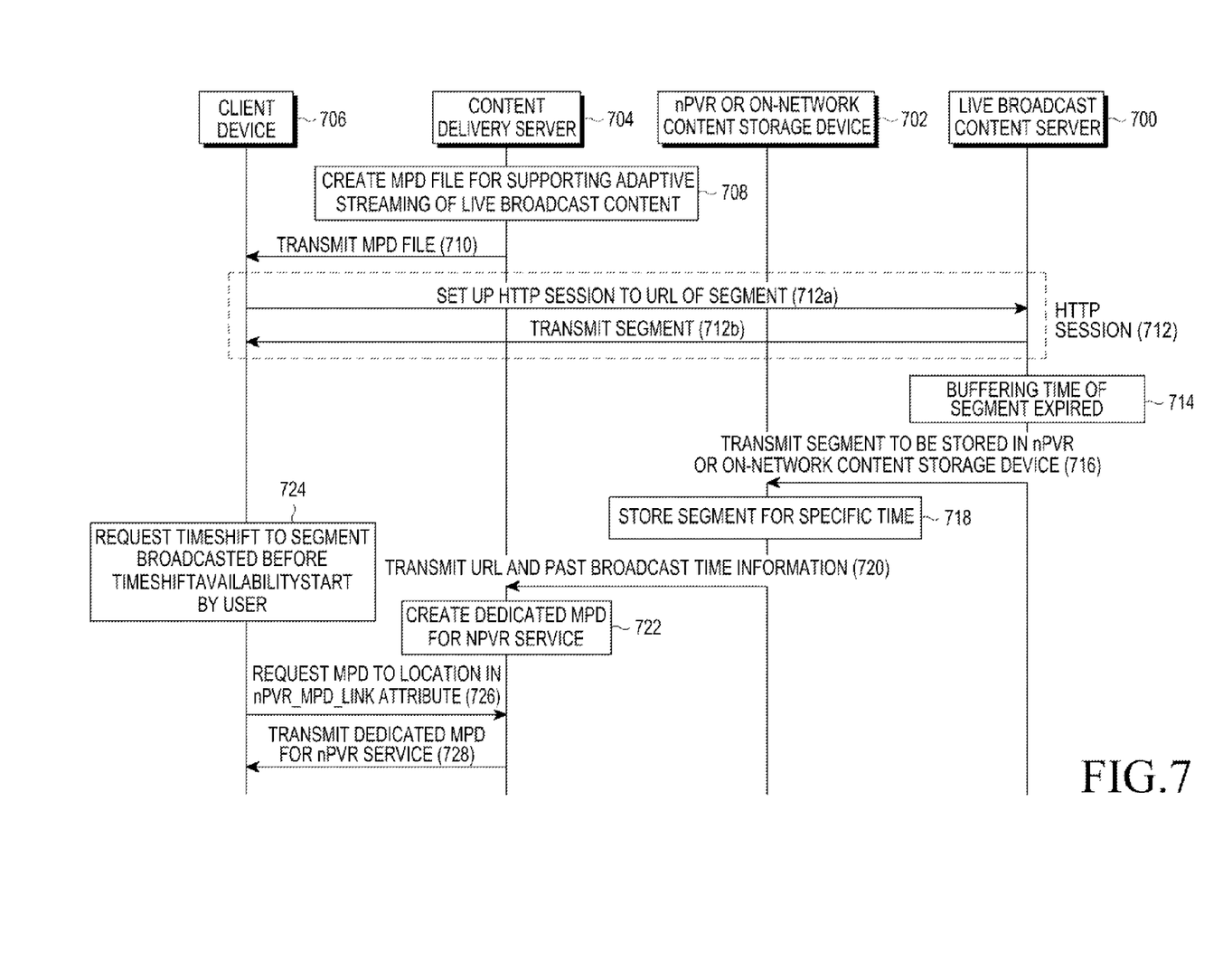
FIGS. 7 and 8 are flow diagrams illustrating an operation among devices according to an exemplary embodiment of the present invention.
Figure 8:
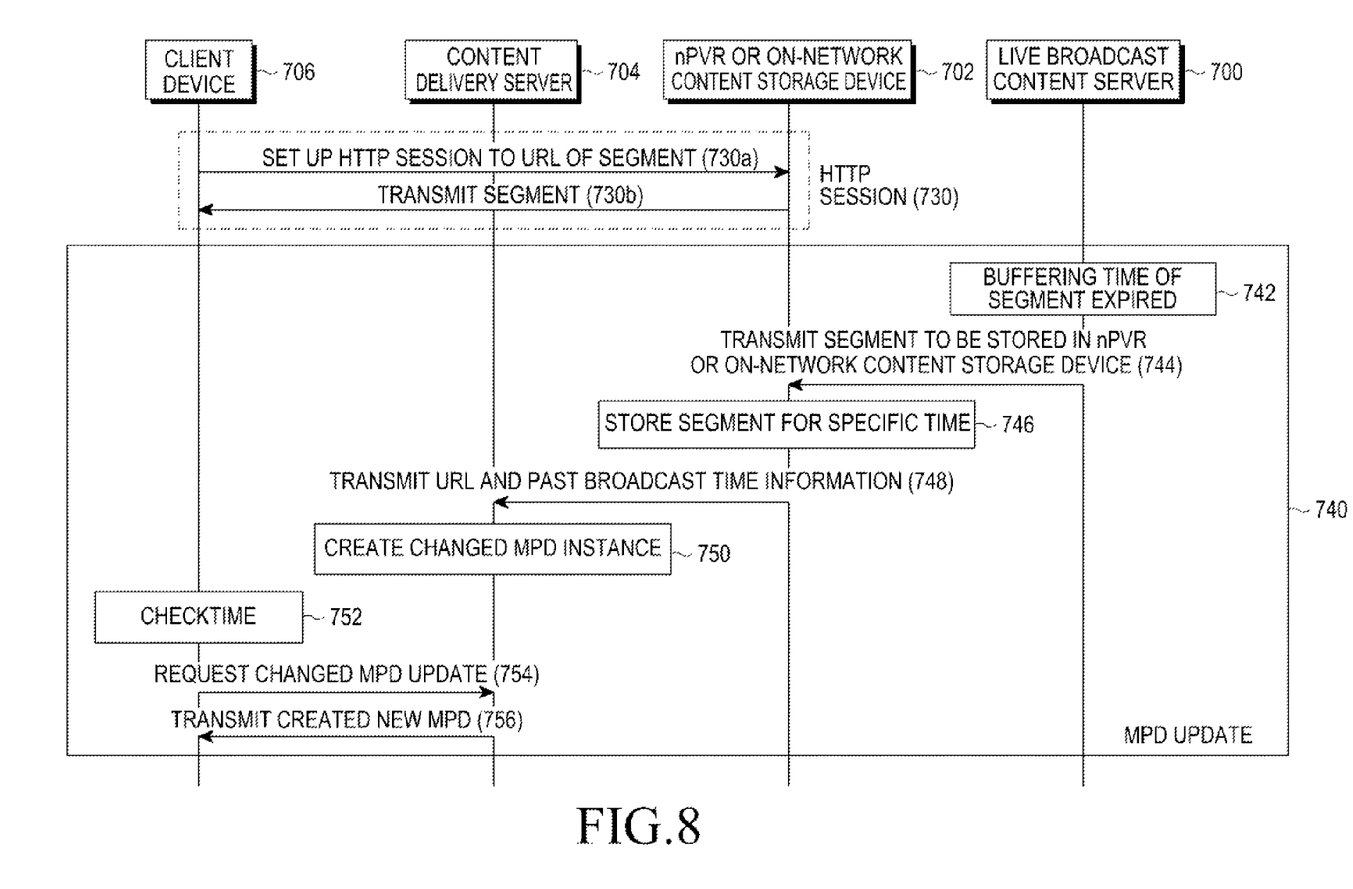

FIGS. 7 and 8 are flow diagrams illustrating an operation among devices according to an exemplary embodiment of the present invention. FIGS. 7 and 8 are separated from a single drawing, for convenience purpose only.

Referring to FIG. 7, since steps 708 to 720 are substantially the same as steps 308 to 320 in FIG. 3, a detailed description thereof will be omitted.

In step 722, a content delivery server 704 creates a dedicated MPD for an nPVR service.

In step 724, a user requests content preceding the content stored in a 'timeShiftBufferDepth' time to request a timeshift to the segment, which was broadcasted before a 'timeShiftAvailabilityStart' time. Then, in step 726, a client 706 connects with the location (URL or URI) designated in an 'nPVR_MPD_link' attribute shown in Table 5, and transmits, to the content delivery server 704, a request for a new MPD for an nPVR or on-network content storage device 702. In step 728, the content delivery server 704 transmits a dedicated MPD for an nPVR service to the client 706 in response to the request received in step 726.

Since steps 730 to 756 are substantially the same as steps 328 to 366 in FIGS. 3 and 4, a detailed description thereof will be omitted.

An exemplary embodiment of the present invention, described with reference to FIGS. 9 and 10, changes the existing URL value to a URL value of an nPVR in which a segment(s) is stored, through an MPD update process.

Figure 9:
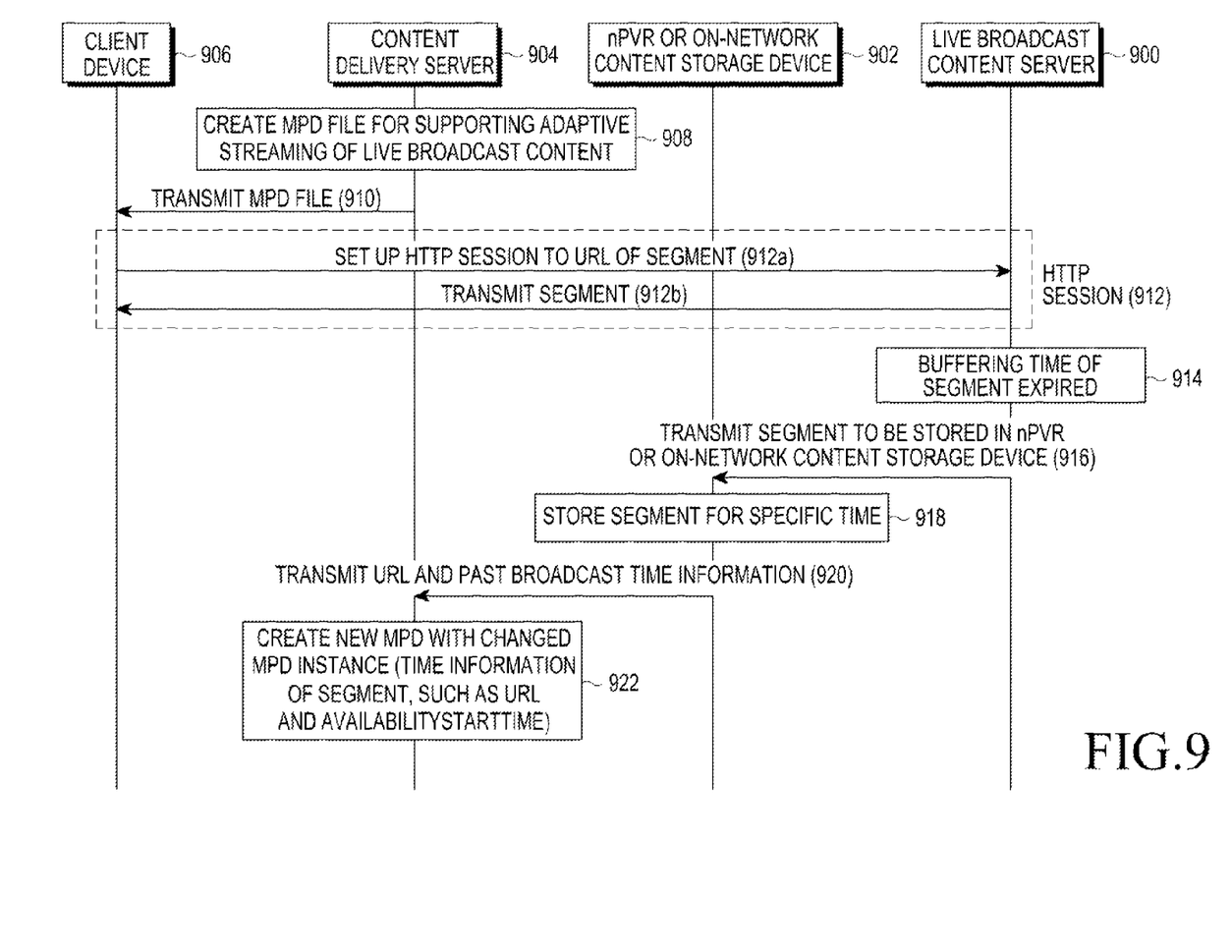
FIGS. 9 and 10 are flow diagrams illustrating an operation among devices according to an exemplary embodiment of the present invention.
Figure 10:
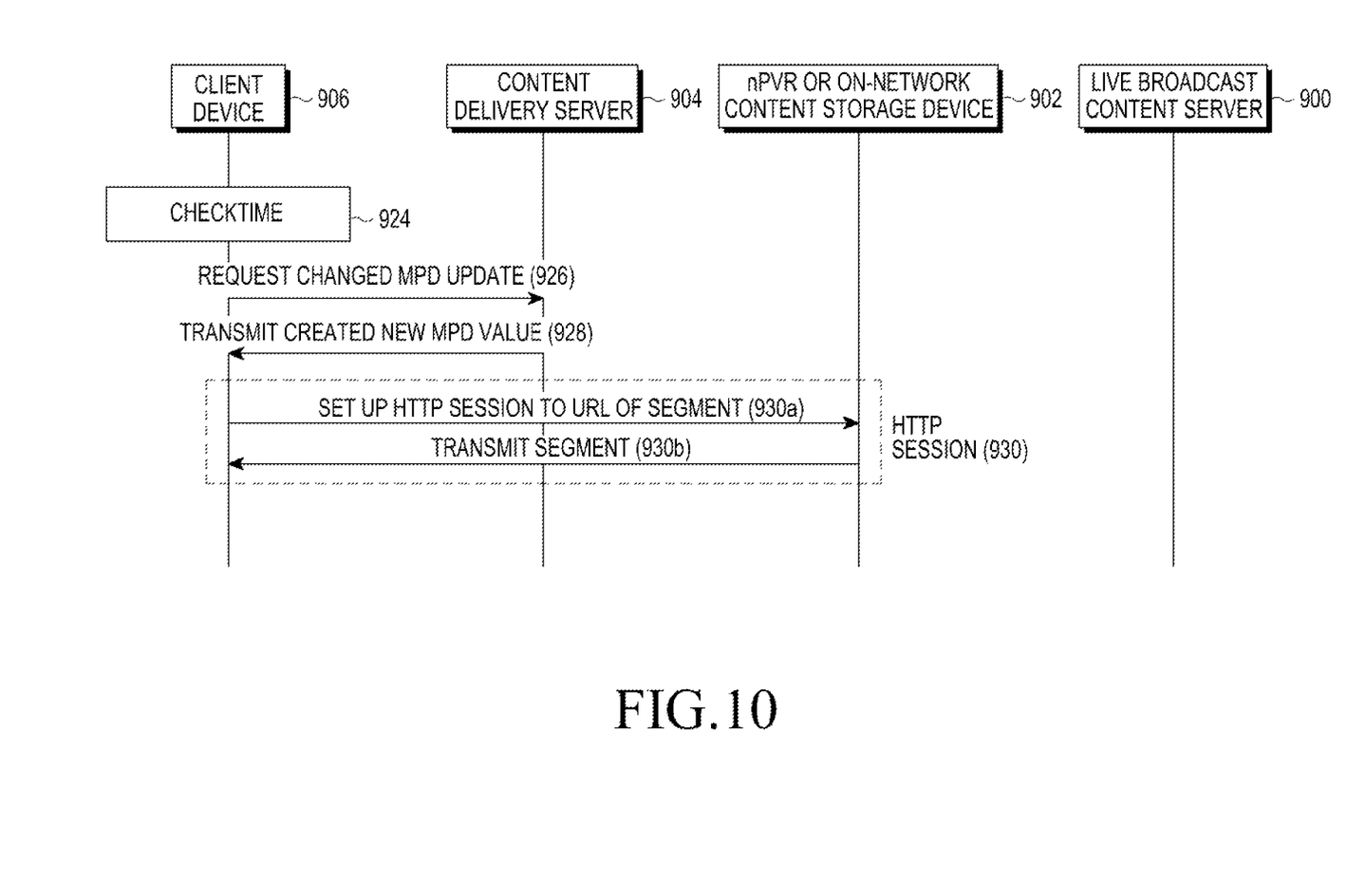

FIGS. 9 and 10 are flow diagrams illustrating an operation among devices according to an exemplary embodiment of the present invention. FIGS. 9 and 10 are separated from a single drawing, for convenience purpose only.

Referring to FIG. 9, since steps 908 to 920 are substantially the same as steps 708 to 720 in FIG. 7, a detailed description thereof will be omitted.

In step 922, the content delivery server 904 creates a new MPD, using the URL of an nPVR or on-network content storage device 902, which is received from the nPVR or on-network content storage device 902 in step 920, and the past broadcast time information. In step 922, the content delivery server 904 changes the existing URL value for the segment to a URL value of the nPVR or on-network content storage device 902. In addition, by changing the existing MPD's time information which is the past broadcast time information, the content delivery server 904 adjusts time information of the MPD so that even though a user views the segment in the future, a presentation time of the segment may represent the time in which the segment was broadcasted live. In other words, 'availabilityStartTime' in the MPD is fixed to the conventional 'availabilityStartTime'. Thus, despite the possible change in location, a valid start time of the segment is fixed to the existing start time at which the segment was broadcasted.

If a checktime has come in step 924, the client 906 transmits an update request for the changed MPD to the content delivery server 904 in step 926. In step 928, the content delivery server 904 transmits the MPD value created in step 922 to the client 906.

Since steps 930, 930a, and 930b in FIG. 10 are substantially the same as steps 730, 730a, and 730b in FIG. 7, a detailed description thereof will be omitted.

As is apparent from the foregoing description, after a broadcast time of broadcast content, a user of the client may request and view the past broadcast content anytime.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A system for providing content in a digital broadcasting system, the system comprising:
a server configured to:
generate a multimedia presentation description (MPD) including a first uniform resource location (URL) information indicating a location of a content provider providing the content and transmit the MPD to a client device;
if a segment of the content is transmitted from the content provider to a network storage after a lapse of a timeshift buffering time of the segment at the content provider and stored in the network storage, receive a second URL information indicating a location where the segment is stored in the network storage from the network storage, wherein the timeshift buffering time corresponds to a time in which a timeshift service for the segment is provided by the server;
generate an updated MPD including the second URL information; and
transmit the updated MPD to the client device,
wherein the client device is configured to:
receive the MPD and the updated MPD, and
acquire the segment stored in the network storage using the second URL information.

2. The system of claim 1, wherein the updated MPD includes information about a time in which the segment was actually broadcasted.

3. The system of claim 1, wherein the MPD is updated in at least one of units of the segment and units of a program formed by the segment.

4. The system of claim 1, wherein the client device requests the server to transmit the updated MPD at a time when the updated MPD is generated.

5. A method for providing content by a server in a digital broadcasting system, the method comprising:
generating a multimedia presentation description (MPD) including a first uniform resource location (URL) information indicating a location of a content provider providing the content and transmitting the MPD to a client device;
receiving, if a segment of the content is transmitted from the content provider to a network storage after a lapse of a timeshift buffering time of the segment at the content provider and stored in the network storage, a second URL information indicating a location where the segment is stored in the network storage from the network storage, wherein the timeshift buffering time corresponds to a time in which a timeshift service for the segment is provided by the server;

generating an updated MPD including the second URL information; and transmitting the updated MPD to the client device.

6. The method of claim 5, wherein the updated MPD includes information about a time in which the segment was actually broadcasted.

7. The method of claim 5, wherein the MPD is updated in at least one of units of the segment and units of a program formed by the segment.

8. The method of claim 5, wherein the updated MPD is transmitted at a time when the updated MPD is generated, after a request for the updated MPD is received from the client device.

9. A server for providing content for digital broadcast, the server comprising:
   a controller configured to execute one or more modules; and
   a memory configured to store the one or more modules,
   wherein the one or more modules is configured to:
      generate a multimedia presentation description (MPD) including a first uniform resource location (URL) information indicating a location of a content provider providing the content,
      transmit the MPD to a client device, if a segment of the content is transmitted from the content provider to a network storage after a lapse of a timeshift buffering time of the segment at the content provider and stored in the network storage, wherein the timeshift buffering time corresponds to a time in which a timeshift service for the segment is provided by the server,
      receive a second URL information indicating a location where the segment is stored in the network storage from the network storage,
      generate an updated MPD including the second URL information, and
      transmit the updated MPD to the client device.

10. The server of claim 9, wherein the updated MPD includes information about a time in which the segment was actually broadcasted.

11. The server of claim 9, wherein the MPD is updated in at least one of units of the segment and units of a program formed by the segment.

12. The server of claim 9, wherein the updated MPD is transmitted at a time when the updated MPD is generated, after a request for the updated MPD is received from the client device.

13. A method for acquiring content by a client device in a digital broadcasting system, the method comprising:
   receiving, from a server, a multimedia presentation description (MPD) including a first uniform resource location (URL) information indicating a location of a content provider providing the content;
   receiving an updated MPD from the server, wherein if a segment of the content is transmitted from the content provider to a network storage after a lapse of a timeshift buffering time of the segment at the content provider and stored in the network storage, the server receives a second URL information indicating a location where the segment is stored in the network storage from the network storage, and the updated MPD includes the second URL information, wherein the timeshift buffering time corresponds to a time in which a timeshift service for the segment is provided by the server; and
   acquiring the segment stored in the network storage using the second URL information.

14. The method of claim 13, wherein the updated MPD includes information about a time in which the segment was actually broadcasted.

15. The method of claim 13, wherein the MPD is updated in at least one of units of the segment and units of a program formed by the segment.

16. The method of claim 13, further comprising requesting the server to transmit the updated MPD at a time when the updated MPD is generated.

17. A client for receiving digital broadcast content, comprising:
   a controller configured to execute one or more modules; and
   a memory to store the one more modules,
   wherein the one or more modules are configured to:
      receive, from a server, a multimedia presentation description (MPD) including a first uniform resource location (URL) information indicating a location of a content provider providing the content; and
      receive an updated MPD from the server,
   wherein if a segment of the content is transmitted from the content provider to a network storage after a lapse of a timeshift buffering time of the segment at the content provider and stored in the network storage, the server receives a second URL information indicating a location where the segment is stored in the network storage from the network storage, and the updated MPD includes the second URL information, wherein the timeshift buffering time corresponds to a time in which a timeshift service for the segment is provided by the server,
      acquire the segment stored in the network storage using the second URL information.

18. The client of claim 17, wherein the updated MPD includes information about a time in which the segment was actually broadcasted.

19. The client of claim 17, wherein the MPD is updated in at least one of units of the segment and units of a program formed by the segment.

20. The client of claim 17, wherein the client device requests the server to transmit the updated MPD at a time when the updated MPD is generated.

21. A system for providing content for digital broadcast, the system comprising:
   a network storage for receiving a segment of the content from a content provider after a lapse of a timeshift buffering time of the segment at the content provider and storing the segment, wherein the timeshift buffering time corresponds to a time in which a timeshift service for the segment is provided by the server;
   a processor for generating a multimedia presentation description (MPD) including a first uniform resource location (URL) information indicating a location of the content provider providing the content and transmitting the MPD to a client device, receiving a second URL information indicating a location where the segment is stored in the network storage from the network storage, and generating an updated MPD including the second URL information; and
   a transmitter for transmitting the updated MPD to a client device.

22. The system of claim 21, wherein the updated MPD includes information about a time in which the segment was actually broadcasted.

23. The system of claim 21, wherein the MPD is updated in units of the segment, or in units of a program formed by the segment.

24. The system of claim 21, wherein the updated MPD is transmitted at a time when the updated MPD is generated, after a request for the updated MPD is received from the client device.

25. A client for receiving content for digital broadcast, the client comprising:

a receiver for receiving, from a server, a multimedia presentation description (MPD) including a first uniform resource location (URL) information indicating a location of a content provider providing the content and for receiving an updated MPD from the server, wherein if a segment of the content is transmitted from the content provider to a network storage after a lapse of a timeshift buffering time of the segment at the content provider and stored in the network storage, the server receives a second URL information indicating a location where the segment is stored in the network storage from the network storage, and the updated MPD includes the second URL information, wherein the timeshift buffering time corresponds to a time in which a timeshift service for the segment is provided by the server; and a processor for acquiring the segment stored in the network storage using the second URL information.

26. The client of claim 25, wherein the updated MPD includes information about a time in which the segment was actually broadcasted.

27. The client of claim 25, wherein the MPD is updated in at least one of units of the segment and units of a program formed by the segment.

28. The client of claim 25, wherein the client requests the server to transmit the updated MPD at a time when the updated MPD is generated.

* * * * *